US012031714B1

(12) United States Patent
Li et al.

(10) Patent No.: US 12,031,714 B1
(45) Date of Patent: Jul. 9, 2024

(54) SHOEBOX LIGHT

(71) Applicant: Torshare Ltd, Guangdong (CN)

(72) Inventors: Mantie Li, Guangdong (CN); Xuanzhi Li, Guangdong (CN); Jian Peng, Guangdong (CN); Liang Chen, Guangdong (CN); Xiaowu Jiang, Guangdong (CN)

(73) Assignee: Torshare Ltd, Shenzhen (CN)

(*) Notice: Subject to any disclaimer, the term of this patent is extended or adjusted under 35 U.S.C. 154(b) by 0 days.

(21) Appl. No.: 18/387,861

(22) Filed: Nov. 8, 2023

(30) Foreign Application Priority Data

Oct. 9, 2023 (CN) ......................... 202311302010.6

(51) Int. Cl.

| | |
|---|---|
| ***F21V 5/04*** | (2006.01) |
| ***F21V 21/30*** | (2006.01) |
| ***F21V 29/70*** | (2015.01) |
| ***F21Y 115/10*** | (2016.01) |

(52) U.S. Cl.
CPC ................ *F21V 5/04* (2013.01); *F21V 21/30* (2013.01); *F21V 29/70* (2015.01); *F21Y 2115/10* (2016.08)

(58) Field of Classification Search
CPC . F21V 5/04; F21V 21/30; F21V 29/70; F21V 5/007; F21V 14/06; F21V 21/10; F21V 23/0442; F21Y 2115/10
See application file for complete search history.

(56) References Cited

U.S. PATENT DOCUMENTS

2017/0234520 A1* 8/2017 Yu ............................ F21V 5/04 362/294

FOREIGN PATENT DOCUMENTS

CN 110360480 * 10/2019 ............. F21V 21/30
CN 211551510 U 9/2020

OTHER PUBLICATIONS

CN 110360480, Ming-jie Zhou, Oct. 22, 2019, English Translation (Year: 2019).*

* cited by examiner

*Primary Examiner* — Peggy A Neils

(57) ABSTRACT

The present invention provides a shoebox light, the shoebox light includes a body and a support, the body includes a housing, an aluminum substrate, a lens, and a power source, the aluminum substrate is provided with a plurality of rows of LED beads on a surface facing the lens, the LED beads have consistent and irregular shaped light spots after undergoing polarizing treatment through the lens, the lens is provided with an arrow that matches the lens's polarization direction, and when the plurality of lenses are installed with different combinations of polarization directions, the shoebox light has different light types. By adopting the present invention, different light types can be achieved according to the needs of actual usage scenarios, increasing the range of application and enhancing user convenience.

10 Claims, 2 Drawing Sheets

SHOEBOX LIGHT

CROSS REFERENCE TO RELATED APPLICATIONS

The present application claims the benefit of Chinese Patent Application No. 202311302010.6 filed on Oct. 9, 2023, the contents of which are incorporated herein by reference in their entirety.

FIELD OF THE INVENTION

The present invention belongs to the field of light fixtures and, more specifically, relates to a shoebox light.

BACKGROUND OF THE INVENTION

LED light fixtures encompass a variety of luminaires that utilize LEDs as their light source, and an LED shoebox light is one of them. Specifically, the LED shoebox light falls under the category of LED street lights. Because of its many advantages such as energy efficiency, environmental friendliness, and a long lifespan, the LED shoebox light is rapidly replacing the street lights of traditional light sources.

A Chinese patent (publication number: CN211551510U) discloses an LED light fixture comprising a cooler, an LED light board, a lens board, and a power source, the cooler includes a light board mounting portion located on the front side and a power source mounting portion located on the rear side, the LED light board is mounting on the light board mounting portion, the lens board covers a light-emitting surface of the LED light board, characterized in that, the LED light fixture further includes a pressure frame, the pressure frame presses the lens board onto the cooler, a first side of the pressure frame is hinged to the cooler, a second side of the pressure frame is buckled to the cooler. However, while a light fixture with this structure is easy to disassemble and assemble, light fixtures of the same model can only fit to one lighting pattern and cannot adapt to different usage environments, resulting in a small range of applications.

SUMMARY OF THE INVENTION

The technical problem to be solved by the present invention is to provide a shoebox light that can effectively address the problem in the prior art of being unable to adapt to different usage environments, resulting in a small range of applications.

To solve the above technical problem, the technical solution adopted by the present invention is as follows:

A shoebox light, wherein the shoebox light includes a body and a support, the body includes a housing, a plurality of aluminum substrates, a plurality of lenses, and a power source, the housing is rotatably connected to the support, the plurality of aluminum substrates, the plurality of lenses, and the power source are all provided inside the housing, the housing is provided with a plurality of embedding grooves for the plurality of lenses to be embedded in, the plurality of aluminum substrates are arranged above the plurality of lenses, the plurality of lenses correspond to the plurality of aluminum substrates on a one-to-one basis, each of the plurality of aluminum substrates is provided with a plurality of rows of LED beads on a surface facing the plurality of lenses, the LED beads have consistent and irregular shaped light spots after each of the LED beads is undergoing polarizing treatment through one of the plurality of lenses, each of the plurality of lenses is provided with an arrow that matches polarization direction thereof, and when the plurality of lenses are installed with different combinations of polarization directions, the shoebox light has different lighting patterns.

As a preferred solution of the present invention, the plurality of lenses include a first lens, a second lens, a third lens, and a fourth lens, the first lens, the second lens, the third lens, and the fourth lens are arranged in a matrix, wherein the first lens is arranged at a left front corner of the housing, the second lens is arranged at a left rear corner of the housing, the third lens is arranged at a right front corner of the housing, and the fourth lens is arranged at a right rear corner of the housing.

As a preferred solution of the present invention, when the first lens, the second lens, the third lens, and the fourth lens are all installed facing front, the lighting pattern of the shoebox light is T3.

As a preferred solution of the present invention, when the first lens is installed facing front, the second lens is installed facing rear, the third lens is installed facing left, and the fourth lens is installed facing right, the lighting pattern of the shoebox light is T4.

As a preferred solution of the present invention, when the first lens is installed facing front, the second lens is installed facing right, the third lens is installed facing left, and the fourth lens is installed facing rear, the lighting pattern of the shoebox light is T5.

As a preferred solution of the present invention, the housing includes an upper cover, a lens cover, and a power source cover, the embedding grooves are provided on the lens cover, the upper cover and the power source cover are snapped together to form a power source accommodating chamber, the power source is installed in the power source accommodating chamber, two ends of the upper cover are provided with a first snap fastener and a second snap fastener respectively, one end of the lens cover is snapped to the upper cover via the first snap fastener, and the other end of the lens cover is rotatably connected to the upper cover, one end of the power source cover is connected to the upper cover via the second snap fastener, and the other end of the power source cover is rotatably connected to the upper cover.

As a preferred solution of the present invention, a light sensor is provided on an upper surface of the upper cover at a place corresponding to the power source accommodating chamber.

As a preferred solution of the present invention, a plurality of heat sinks are provided on an upper surface of the upper cover, the heat sinks are arranged at intervals.

As a preferred solution of the present invention, the support includes a first shaft and a second shaft, the upper cover is provided with a connecting block, one end of the first shaft is fixedly connected to the connecting block, and the other end of the first shaft is rotatably connected to the second shaft.

As a preferred solution of the present invention, the first shaft is provided with a scale.

The implementation of the present invention provides a shoebox light, which, compared to the prior art, has the following advantageous effects:

Since the lens is provided with the arrow that matches the lens's polarization direction, when the polarization direction of the lens is being adjusted, the orientation of the lens surface relative to the LED beads can thereby be changed. Different polarization directions will cause light to enter or leave the lens at different angles, thereby changing the light's propagation path and distribution. Thus, when the plurality of lenses are installed with different combinations of polarization directions, the shoebox light has different lighting patterns. During use, by adjusting the polarization directions of the plurality of lenses to different combinations according to the needs of actual usage scenarios, different lighting patterns of the shoebox light can be achieved, increasing the range of application. Furthermore, through the rotation between the housing and the support, the angle between the housing and the support can thereby be adjusted, and the light angle can further be adjusted, enhancing user convenience. By adopting the present invention, different lighting patterns can be achieved according to the needs of actual usage scenarios, increasing the range of application and enhancing user convenience.

BRIEF DESCRIPTION OF THE DRAWINGS

To provide a clearer illustration of the technical solutions of the embodiments of the present invention, a brief introduction to the drawings of the embodiments will be provided below.

Figure 1:
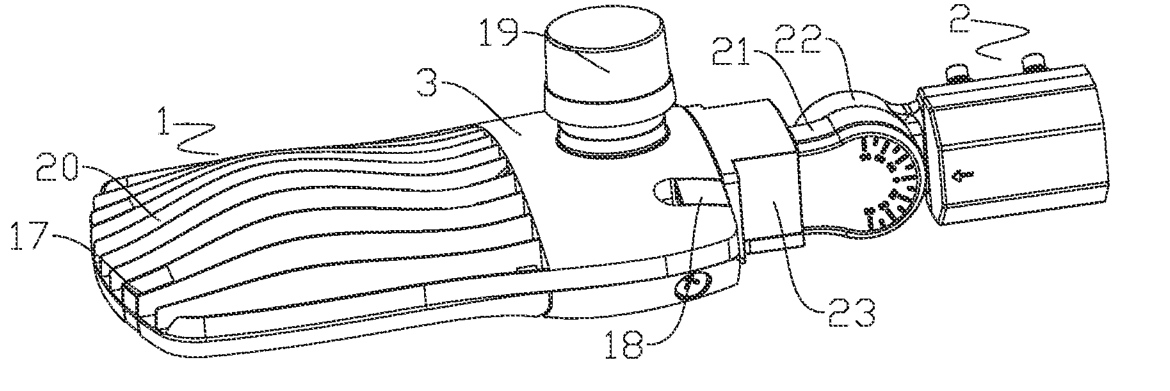
FIG. 1 is a schematic diagram of the structure of a shoebox light provided in an embodiment of the present invention.

Reference signs in the drawings:

body 1; support 2; housing 3; aluminum substrate 4; lens 5; power source 6; embedding groove 7; LED bead 8; first lens 9; second lens 10; third lens 11; fourth lens 12; upper cover 13; lens cover 14; power source cover 15; power source accommodating chamber 16; first snap fastener 17; second snap fastener 18; light sensor 19; heat sink 20; first shaft 21; second shaft 22; connecting block 23.

DETAILED DESCRIPTION OF THE INVENTION

In conjunction with the drawings and embodiments, a more detailed description of the specific embodiments of the present invention is provided below. The embodiments described below are provided for illustrating the present invention, but are not for limiting the scope of the present invention.

In the description of the present invention, it should be understood that the terms "up," "down," "left." "right." "front," "rear," "top." "bottom," and the like indicating the orientation or position relationship are based on the orientation or positional relationship shown in the drawings. These terms are used for convenience in describing the present invention and simplifying the description, and do not indicate or imply that the device or element referred to must have a specific orientation, or be constructed or operated in a specific orientation. Therefore, these terms should not be construed as limiting the present invention. It should be understood that in the present invention, the terms "first," "second," and the like are used to describe various information, but the information should not be limited to these terms. These terms are used only to distinguish information of the same type from each other. For example, within the scope of the present invention, the "first" information can also be referred to as the "second" information, and similarly, the "second" information can also be referred to as the "first" information.

Figure 2:
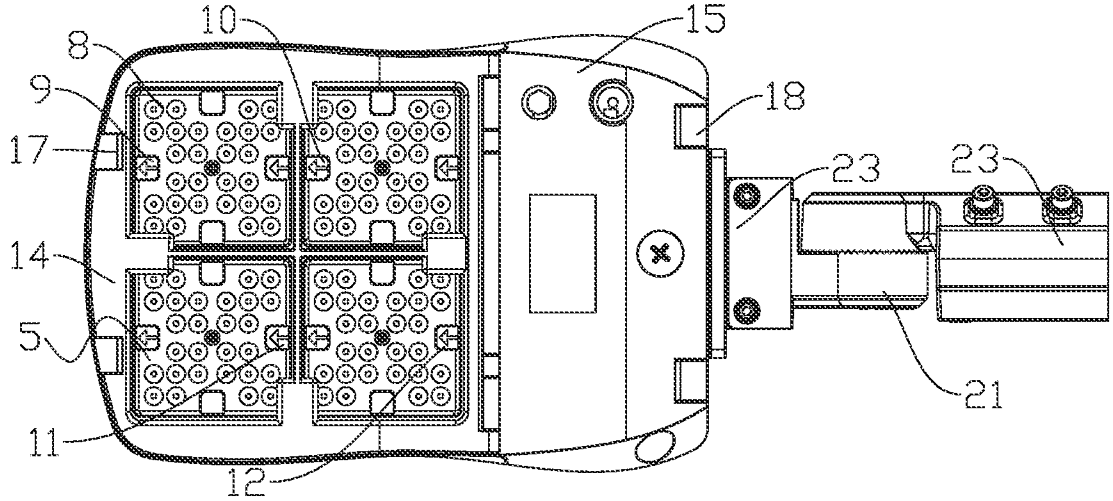
FIG. 2 is a schematic diagram from another perspective of the structure of a shoebox light provided in an embodiment of the present invention.
Figure 3:
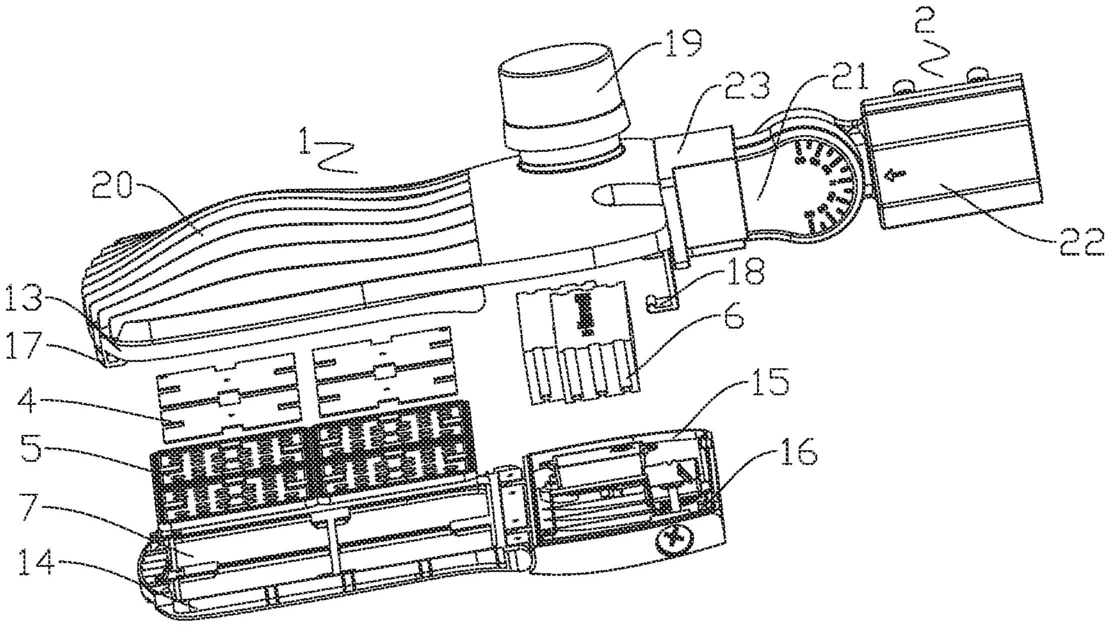
FIG. 3 is an exploded view of a shoebox light provided in an embodiment of the present invention.

As shown in FIGS. 1-3, a preferred embodiment of the present invention provides a shoebox light, wherein the shoebox light includes a body 1 and a support 2, the body 1 includes a housing 3, a plurality of aluminum substrates 4, a plurality of lenses 5, and a power source 6, the housing 3 is rotatably connected to the support 2, the plurality of aluminum substrates 4, the plurality of lenses 5, and the power source 6 are all provided inside the housing 3, the housing 3 is provided with a plurality of embedding grooves 7 for the plurality of lenses 5 to be embedded in, the plurality of aluminum substrates 4 are arranged above the plurality of lenses 5, the plurality of lenses 5 correspond to the plurality of aluminum substrates 4 on a one-to-one basis, each of the plurality of aluminum substrates 4 is provided with a plurality of rows of LED beads 8 on a surface facing the plurality of lenses 5, the LED beads 8 have consistent and irregular shaped light spots after each of the LED beads is undergoing polarizing treatment through one of the plurality of lenses 5, each of the plurality of lenses 5 is provided with an arrow that matches polarization direction thereof, and when the plurality of lenses 5 are installed with different combinations of polarization directions, the shoebox light has different lighting patterns.

Since each of the plurality of lenses 5 is provided with the arrow that matches the polarization direction of the each of the plurality of lenses 5, when the polarization direction of a lens 5 is being adjusted, the orientation of the lens 5 surface relative to the LED beads 8 can thereby be changed. Different polarization directions will cause light to enter or leave the lens 5 at different angles, thereby changing the light's propagation path and distribution. Thus, when the plurality of lenses 5 are installed with different polarization directions, the shoebox light has different lighting patterns. During use, by adjusting the polarization directions of the plurality of lenses 5 to different combinations according to the needs of actual usage scenarios, different lighting patterns of the shoebox light can be achieved, increasing the range of application. Furthermore, through the rotation between the housing 3 and the support 2, the angle between the housing 3 and the support 2 can thereby be adjusted, and the light angle can further be adjusted, enhancing user convenience. By adopting the present invention, different lighting patterns can be achieved according to the needs of actual usage scenarios, increasing the range of application and enhancing user convenience.

In the present embodiment, the lenses 5 include a first lens 9, a second lens 10, a third lens 11, and a fourth lens 12, the first lens 9, the second lens 10, the third lens 11, and the fourth lens 12 are arranged in a matrix, wherein the first lens 9 is arranged at a left front corner of the housing 3, the second lens 10 is arranged at a left rear corner of the housing 3, the third lens is arranged at a right front corner of the housing 3, and the fourth lens 12 is arranged at a right rear corner of the housing 3.

As an example, when the first lens 9, the second lens 10, the third lens 11, and the fourth lens 12 are all installed facing front, the lighting pattern of the shoebox light is T3.

As an example, when the first lens 9 is installed facing front, the second lens 10 is installed facing rear, the third lens 11 is installed facing left, and the fourth lens 12 is installed facing right, the lighting pattern of the shoebox light is T4.

As an example, when the first lens 9 is installed facing front, the second lens 10 is installed facing right, the third lens 11 is installed facing left, and the fourth lens 12 is installed facing rear, the lighting pattern of the shoebox light is T5.

As an example, the housing 3 includes an upper cover 13, a lens cover 14, and a power source cover 15, the embedding grooves 7 are provided on the lens cover 14, the upper cover 13 and the power source cover 15 are snapped together to form a power source accommodating chamber 16, the power source 6 is installed in the power source accommodating chamber 16, two ends of the upper cover 13 are provided with a first snap fastener 17 and a second snap fastener 18 respectively, one end of the lens cover 514 is snapped to the upper cover 13 via the first snap fastener 17, and the other end of the lens cover 14 is rotatably connected to the upper cover 13, one end of the power source cover 15 is connected to the upper cover 13 via the second snap fastener 18, and the other end of the power source cover 15 is rotatably connected to the upper cover 13. During assembly, the lens cover 14 or the power source cover 15 can be opened by simply unfastening the first snap fastener 17 or the second snap fastener 18, which is convenient for assembly and improves assembly efficiency. In addition, during subsequent maintenance, the lens 5 and the power source 6 can be easily replaced or repaired, thereby improving maintenance efficiency.

As an example, a light sensor 19 is provided on an upper surface of the upper cover 13 at a place corresponding to the power source accommodating chamber 16. In specific implementations, when natural light is brighter than a set brightness, the power source 6 can be turned off, and when natural light is darker than the set brightness, the power source 6 can be turned on, saving the power of power source 6 and extending the service life of the shoebox light.

As an example, to prevent the shoebox light from overheating, a plurality of heat sinks 20 are provided on an upper surface of the upper cover 13, the heat sinks 20 are arranged at intervals.

As an example, the support 2 includes a first shaft 21 and a second shaft 22, the upper cover 13 is provided with a connecting block 23, one end of the first shaft 21 is fixedly connected to the connecting block 23, and the other end of the first shaft 21 is rotatably connected to the second shaft 22. Therefore, the installation angle of the support 2 can be rotated according to the actual assembly needs, enhancing user convenience.

As an example, the first shaft 21 is provided with a scale. By this means, the angle between the housing 3 and the support 2 can be read through the scale, allowing for a more precise adjustment of the installation angle, enhancing user convenience.

In the description of the present invention, it should be noted that unless otherwise specified or limited, the terms "connected" and "connection" should be understood in a broad sense. As an example, it can be a fixed connection, a detachable connection, or an integral connection; it can be a mechanical connection or an electrical connection; it can be a direct connection or an indirect connection through an intermediate medium; it can be a communication between two components. For those skilled in the art, the specific meaning of the above terms in the present invention can be understood based on the specific situation.

The above are only the preferred embodiments of the present invention. It should be pointed out that for those skilled in the art in this field, without departing from the technical principles of the present invention, various improvements and substitutions can be made, and these improvements and substitutions should also be regarded as within the scope of protection of the present invention.

The invention claimed is:

1. A shoebox light, wherein the shoebox light comprises a body and a support, the body comprises a housing, a plurality of aluminum substrates, a plurality of lenses, and a power source, the housing is rotatably connected to the support, the plurality of aluminum substrates, the plurality of lenses, and the power source are all provided inside the housing, the housing is provided with a plurality of embedding grooves for the plurality of lenses to be embedded in, the plurality of aluminum substrates are arranged above the plurality of lenses, the plurality of lenses correspond to the plurality of aluminum substrates on a one-to-one basis, each of the plurality of aluminum substrates is provided with a plurality of rows of LED beads on a surface facing the plurality of lenses, the LED beads have consistent and irregular shaped light spots after each of the LED beads is undergoing polarizing treatment through one of the plurality of lenses, each of the plurality of lenses is provided with an arrow that matches polarization direction thereof, and when the plurality of lenses are installed with different combinations of polarization directions, the shoebox light has different lighting patterns.

2. The shoebox light according to claim 1, wherein the plurality of lenses comprise a first lens, a second lens, a third lens, and a fourth lens, the first lens, the second lens, the third lens, and the fourth lens are arranged in a matrix, wherein the first lens is arranged at a left front corner of the housing, the second lens is arranged at a left rear corner of the housing, the third lens is arranged at a right front corner of the housing, and the fourth lens is arranged at a right rear corner of the housing.

3. The shoebox light according to claim 2, wherein when the first lens, the second lens, the third lens, and the fourth lens are all installed facing front, the lighting pattern of the shoebox light is T3.

4. The shoebox light according to claim 2, wherein when the first lens is installed facing front, the second lens is installed facing rear, the third lens is installed facing left, and the fourth lens is installed facing right, the lighting pattern of the shoebox light is T4.

5. The shoebox light according to claim 2, wherein when the first lens is installed facing front, the second lens is installed facing right, the third lens is installed facing left, and the fourth lens is installed facing rear, the lighting pattern of the shoebox light is T5.

6. The shoebox light according to claim 1, wherein the housing comprises an upper cover, a lens cover, and a power source cover, the embedding grooves are provided on the lens cover, the upper cover and the power source cover are snapped together to form a power source accommodating chamber, the power source is installed in the power source accommodating chamber, two ends of the upper cover are provided with a first snap fastener and a second snap fastener respectively, one end of the lens cover is snapped to the upper cover via the first snap fastener, and the other end of the lens cover is rotatably connected to the upper cover, one end of the power source cover is connected to the upper cover via the second snap fastener, and the other end of the power source cover is rotatably connected to the upper cover.

7. The shoebox light according to claim 6, wherein a light sensor is provided on an upper surface of the upper cover at a place corresponding to the power source accommodating chamber.

8. The shoebox light according to claim 6, wherein a plurality of heat sinks are provided on an upper surface of the upper cover, the heat sinks are arranged at intervals.

9. The shoebox light according to claim 6, wherein the support comprises a first shaft and a second shaft, the upper cover is provided with a connecting block, one end of the first shaft is fixedly connected to the connecting block, and the other end of the first shaft is rotatably connected to the second shaft.

10. The shoebox light according to claim 9, wherein the first shaft is provided with a scale.

* * * * *